(No Model.) 2 Sheets—Sheet 1.

C. D. PURVIS.
INCUBATOR.

No. 511,546. Patented Dec. 26, 1893.

Witnesses.
A. Ruppert.
H. A. Daniels.

Inventor.
Charley D. Purvis
Per
Thomas P. Simpson
Atty

THE NATIONAL LITHOGRAPHING COMPANY,
WASHINGTON, D. C.

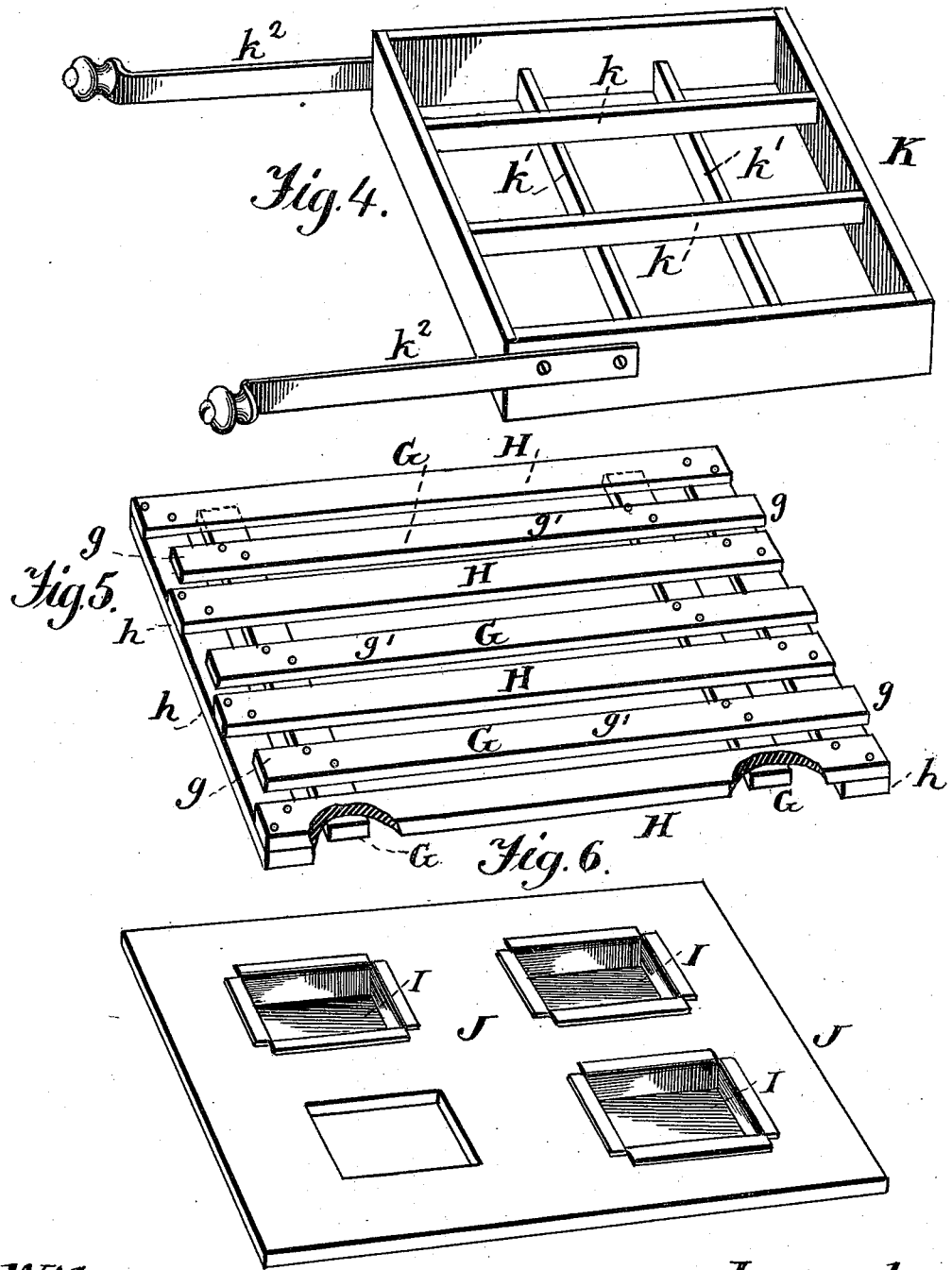

UNITED STATES PATENT OFFICE.

CHARLEY DELLNO PURVIS, OF CARDINGTON, OHIO.

INCUBATOR.

SPECIFICATION forming part of Letters Patent No. 511,546, dated December 26, 1893.

Application filed February 13, 1893. Serial No. 462,135. (No model.)

*To all whom it may concern:*

Be it known that I, CHARLEY DELLNO PURVIS, a citizen of the United States, residing at Cardington, in the county of Morrow and State of Ohio, have invented certain new and useful Improvements in Incubators; and I do declare the following to be a full, clear, and exact description of the invention, such as will enable others skilled in the art to which it appertains to make and use the same, reference being had to the accompanying drawings, and to letters of reference marked thereon, which form a part of this specification.

The special object of the invention is to make an incubator in which the proper degree of temperature may be easily maintained; the eggs conveniently turned at the proper times; the chickens as they hatch separated from the unhatched eggs; and the moisture pans removed without disturbing the eggs.

Figure 1:
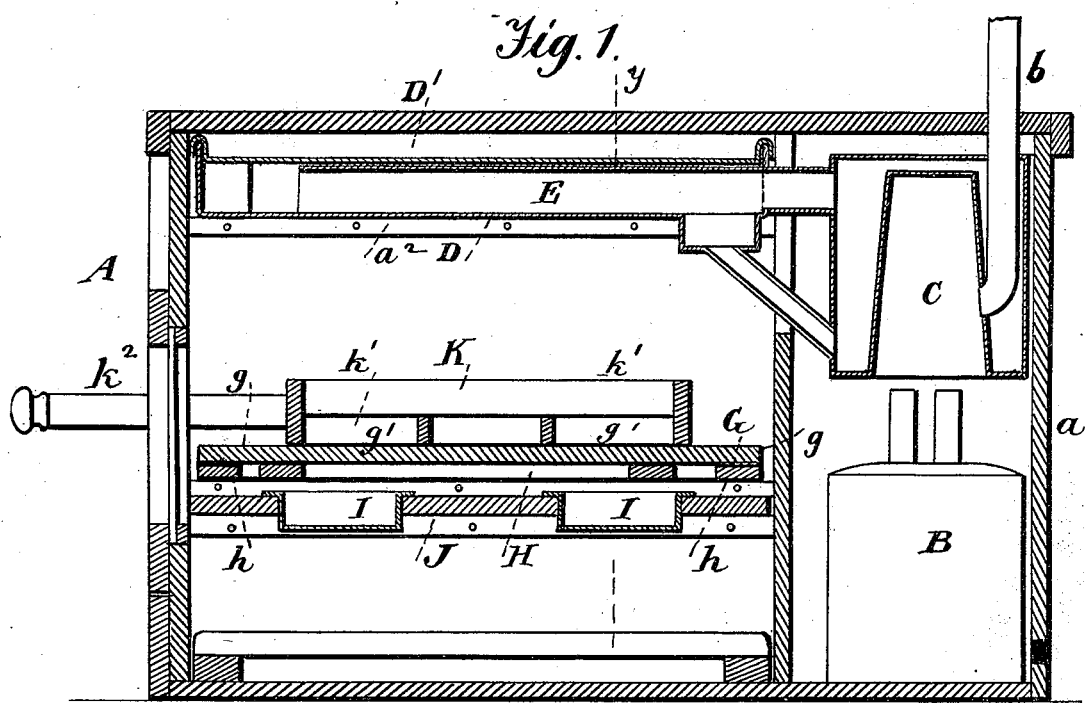
Figure 2:
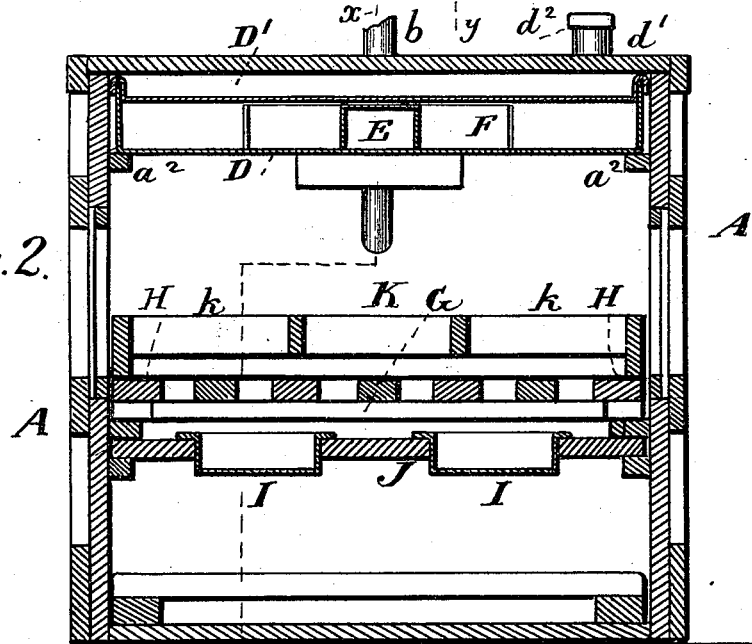
Figure 3:
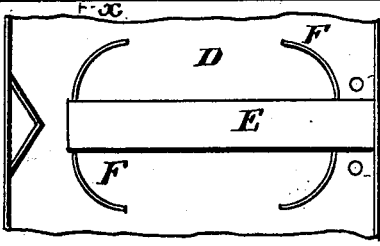

Figure 1 of the drawings is a longitudinal vertical section on dotted line $x$ $x$ of Fig. 2; Fig. 2 a vertical cross-section on the dotted line $y$ $y$ of Fig. 1, and Fig. 3 a detail plan view of the covered pan at the top of incubator; Fig. 4 a perspective view of the egg turner; Fig. 5 a similar view of the egg-support formed of two interlacing and separable frames, and Fig. 6 a similar view of the water pans in their sliding holder.

In the drawings, A represents the casing of the incubator with a projection $a$ in which is placed a lamp B or a heater of any suitable kind. Over this is placed a boiler C concaved on the under side to form a combustion chamber communicating with a smoke-pipe $b$, the water chamber being thus made to surround the heater, while the latter receives a supply of air through the bottom from holes in the bottom or near the bottom of the projection $a$.

D is the covered pan into which water is poured so as to pass through bottom holes $d$ into the boiler or water jacket C until the pan and water jacket are both full or nearly so, the top of pan being a little above that of the jacket, the water being at the same height or nearly so. As the water becomes heated, the warm water pushes its way up through the channel E into the pan while the cooler water passes down through the holes $d$, thus producing a continuous circulation of hot water from which the inside of the incubator may be kept at the desired degree of temperature. I may use deflectors F to direct the course of the water in the pan D.

D' is the pan cover which fits closely into the upper part of the pan and is provided with the vertical pipe $d'$ on which is a screw cap $d^2$. The pan D is supported upon the opposite ribs $a^2$ $a^2$ so as to be easily put in and taken out, and beneath it is placed the frame K which has the handles $k^2$ $k^2$ and the partitions $k$ $k'$ to form spaces within which each egg shall be placed to itself, the eggs bearing lightly against said partitions and being supported by the strips $g'$ of the frame G. The frame G has projections $g$ that slide on or off the side-pieces $h$ $h$ of the frame H from which it may thus be easily separated.

Below the frames G H are arranged the moisture pans I in a slide J so that the water in the pans may be replenished without disturbing the eggs. Below the moisture-pan slide is arranged a mattress or equivalent receptacle for the chicks as soon as they are hatched and to which they drop. In about twenty days hen eggs may begin to hatch, when the frame G and slide J are removed to permit the chicks to drop through the spaces between the strips of frame H.

It will be observed that the slat-frames G H are so connected that the frame G may be adjusted in one direction to regulate the spaces between the slats and slides and also at right angles thereto so as to be taken away from frame H.

What I claim as new, and desire to protect by Letters Patent, is—

1. In an incubator, the frame H, formed of longitudinal slats connected at the ends by cross-slats $h$ $h$, in combination with the frame G having longitudinal slats connected by cross-slats to leave projecting ends $g$ $g$ adapted to slide on the cross slats *h h* both longitudinally and transversely as and for the purposes set forth.

2. In an incubator, the combination with a separable slatted egg support, of a subjacent removable slide containing the water pans and below this a mattress; whereby the slide and part of egg support may be removed and the hatched young permitted to fall upon a soft receptacle as set forth.

In testimony whereof I affix my signature in presence of two witnesses.

CHARLEY DELLNO PURVIS.

Witnesses:
H. BOWEN,
O. P. RUSSELL.